April 11, 1950          R. M. STORER          2,503,305
FASTENING DEVICE
Filed March 3, 1944          3 Sheets-Sheet 1
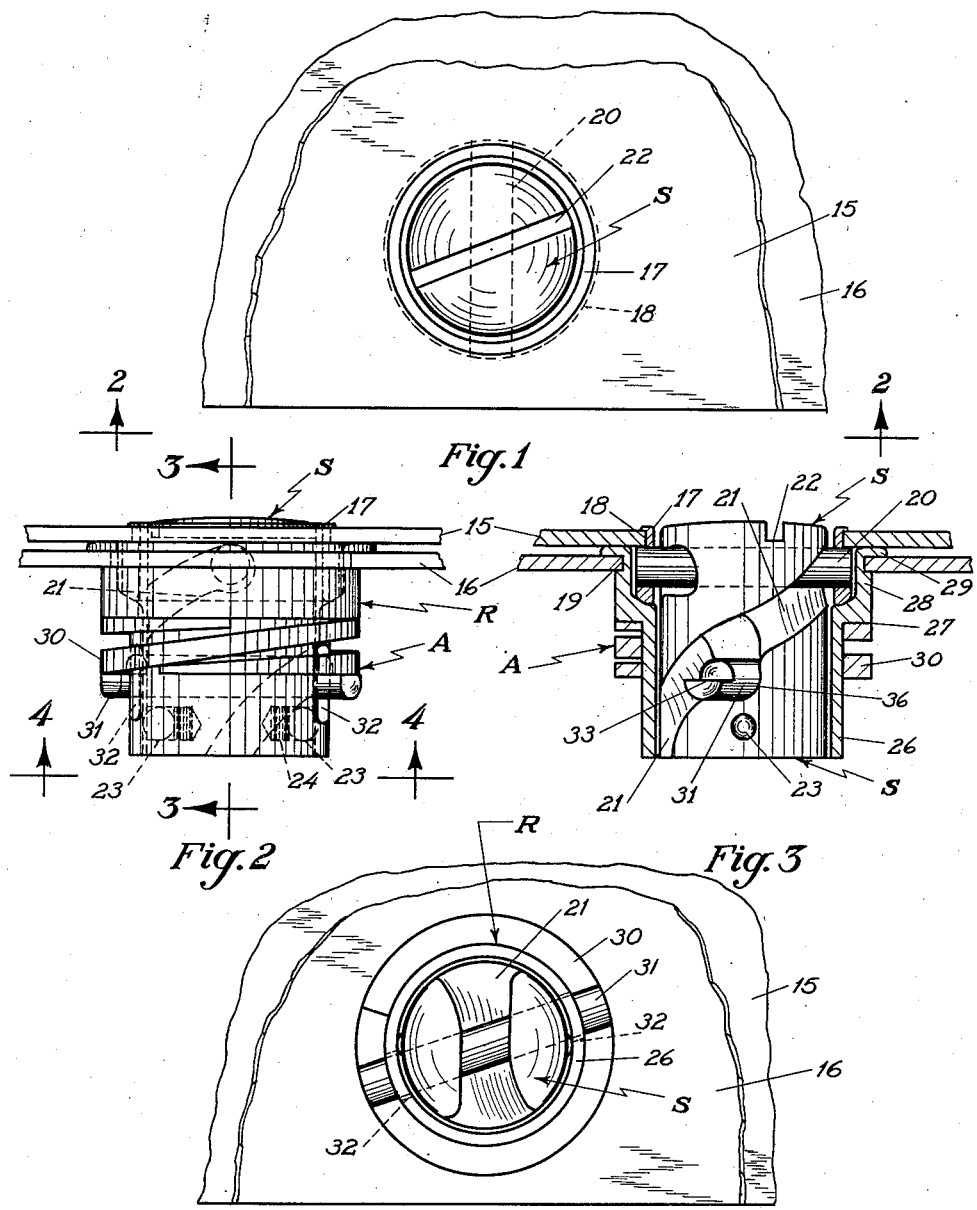
RICHARD M. STORER
INVENTOR.
BY *H. A. McGrew*
*Attorney*

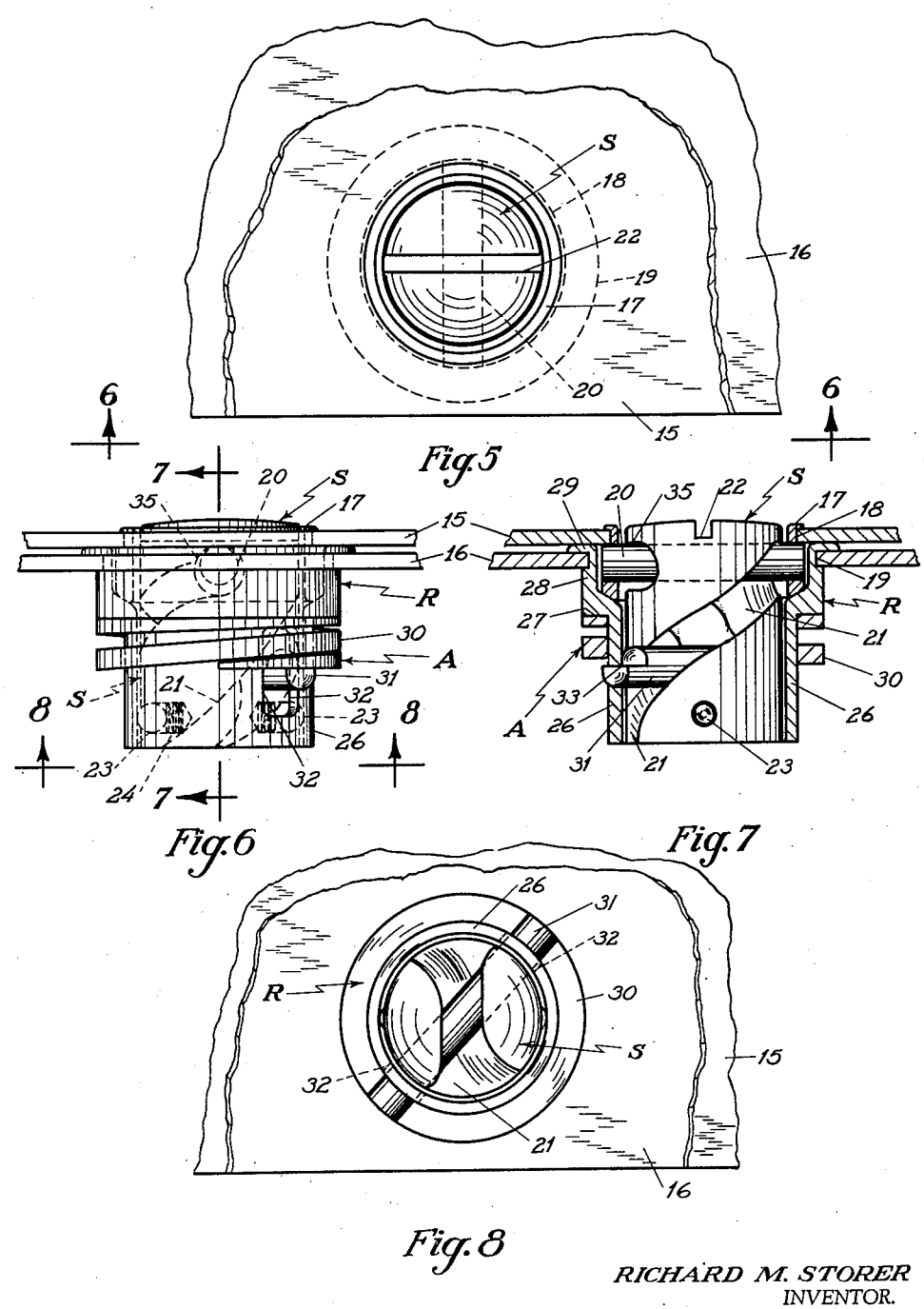
April 11, 1950  R. M. STORER  2,503,305
FASTENING DEVICE
Filed March 3, 1944  3 Sheets-Sheet 2
RICHARD M. STORER
INVENTOR.

April 11, 1950   R. M. STORER   2,503,305
FASTENING DEVICE
Filed March 3, 1944   3 Sheets-Sheet 3

RICHARD M. STORER
INVENTOR.

BY
*H. A. McGrew*
*Attorney*

Patented Apr. 11, 1950

2,503,305

UNITED STATES PATENT OFFICE 2,503,305

FASTENING DEVICE

Richard M. Storer, Denver, Colo.

Application March 3, 1944, Serial No. 524,857

19 Claims. (Cl. 24—221)

This invention relates to devices for fastening two or more parts or plates together, and more particularly to quick-opening fastening devices, such as cowling fasteners for airplanes.

The fastening device of this invention is particularly adapted to secure together two parts, one of which is to be removed and replaced quickly, such as a cowling section attached to a support of the engine nacelle of an airplane. The cowling must be removed and replaced quickly in inspecting or replacing the engine, and a plurality of fastening devices normally are utilized in attaching each cowling section to its support. In addition to its use on airplanes, the fastening device of this invention may be utilized for fastening access plates on farm machinery, panels on motor trucks, refrigerator equipment, heating units, radios and other electronic equipment, and the like.

A fastening device of the above character desirably is fastened and unfastened quickly, is operated with a simple tool such as a screw driver or a coin, is locked selectively securely in closed position when the two parts are fastened together, and all parts thereof are flush with the outside plate or cowling to provide minimum air resistance and a pleasing appearance. Other desirable characteristics include lightness in weight and ease and low cost of manufacture, as well as compactness and simplicity of construction.

A cowling fastener previously used to a considerable extent fulfills to a degree some of the above requirements and desirable characteristics. Such a fastener consists of a stud rotatably secured to the outside plate, such as the cowling of an airplane, and a relatively heavy special wire attached to the inside plate, such as the cowling support. The stud may have a flat head and be fastened by a grommet in a counter-sunk or dimpled hole in the cowling, so that the head of the stud is flush with the cowling. The shank of the stud is provided with a bayonet slot having a shoulder at its upper end, the slot being adapted to slip over the central portion of the wire which extends across an aperture in the support, the stud being inserted through the aperture. Upon rotation of the stud, the wire is pulled up into the slot and is locked in position on the shoulder. Each end of the wire is provided with a spring coil, each coil being attached by a rivet to the support on opposite sides of the aperture.

Among the objects of this invention are to provide a device for fastening two parts together which to a high degree fulfills the requirements and possesses the desirable characteristics set forth above. Further objects are to provide such a device which may be made so as to be interchangeable with the above previous type of device in widespread use, but which is an improvement thereon; to provide such a device which may be varied in design or shape; and to provide such a device which may be utilized in a number of places and with greater ease than heretofore. Other objects and novel features will become apparent from the description which follows.

A device for fastening two parts together, constructed in accordance with this invention, may include a stud having a shank provided with a bayonet or inclined slot and turnably secured or attached to one part by suitable means so that the head of the stud may be flush with the outer surface, and a receptacle adapted to be attached to the second part. Preferably, the receptacle includes an extending tubular body portion having a shoulder adjacent the part to which the receptacle is attached, and forming a space within for reception of the stud-attaching means. The outside of the shoulder provides a support or resting place for a spring assembly which preferably includes a cross member engageable by the inclined slot in the stud shank, and the extending body portion of the receptacle may have opposed grooves for guiding the cross member and preventing rotation thereof. The stud-attaching means may also be provided with a pin extending across the aperture through which the stud is inserted and adapted to engage the stud slot, while a shoulder may be provided at suitable positions along the stud slot to engage the cross member or pin, or both, for locking purposes.

Other features will become apparent from the following more detailed description of specific embodiments of this invention, taken with reference to the accompanying drawings in which:

Fig. 1 is a plan view looking toward the head of the stud of a device constructed in accordance with this invention, fastening a pair of plates together;

Fig. 2 is a side elevation of the assembly of Fig. 1, looking in the direction of arrows 2—2 of Fig. 1;

Fig. 3 is a section taken along line 3—3 of Fig. 2;

Fig. 4 is a plan view looking toward the receptacle of the device of Fig. 1;

Fig. 5 is a plan view, similar to Fig. 1, of a second embodiment of this invention fastening a pair of plates together;

Fig. 6 is a side elevation of the assembly of Fig. 5, looking in the direction of the arrows 6—6 of Fig. 5;

Fig. 7 is a section taken along line 7—7 of Fig. 5;

Fig. 8 is a plan view similar to Fig. 4, of the assembly of Fig. 5;

Figure 9:
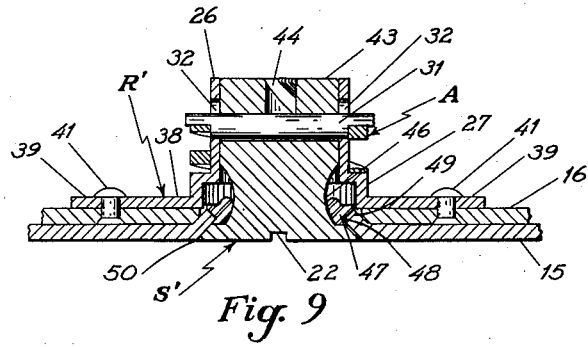
Fig. 9 is a cross section illustrating a third embodiment of this invention, which is interchangeable with the previous type of fastener in widespread use.

A fastening device constructed in accordance with this invention is adapted, as in Fig. 1, to fasten an outer plate 15 to an inner plate 16, the outer and inner plates corresponding, respectively, to the cowling of an airplane and its support. As in Figs. 1 to 4, inclusive, the fastening device includes a stud S adapted to be secured to outer plate 15, and a receptacle R adapted to be attached to inner plate 16. The stud may be secured to the outer plate in a suitable manner, but preferably so that the lead of the stud will lie flush with the outside of the plate when the stud is in closed position. For this purpose, a grommet or equivalent means permitting relative rotation and limited longitudinal movement of the stud with respect to the plate may be utilized. Thus, the securing means for the stud may include a grommet 17, which is riveted over at one end 55, as in Fig. 2, around the periphery of a hole 18 in plate 15 through which the grommet and stud extend inwardly toward plate 16 and through a corresponding, larger hole 19 in plate 16. The grommet may be provided with a pin 20 extending across hole 18 and adapted to engage a bayonet slot 21 in the shank of the stud. The bayonet slot is adapted to engage a cooperating element of receptacle R, as described in detail later, to lock the plates together. Pin 20 acts as a guide for the stud in its turning movement or rotation during locking and unlocking movements effected by a suitable tool, such as a screw driver or a coin, inserted in a slot 22 in the head of the stud.

In the embodiment shown in Figs. 1 to 4, inclusive, the stud may be turned counterclockwise, as viewed in Fig. 1, to an unlocked position in which it extends above plate 15 almost its entire length. To prevent the stud from falling out of the plate when in such position, a pair of detent balls 23 may be provided adjacent the inner end of the stud shank, the detent balls being pressed outwardly by springs 24 and being adapted to catch against the edge of grommet 17, to retain the stud in unlocked position.

The receptacle R preferably includes an extending tubular body portion 26, as shown more clearly in Fig. 2, having a shoulder 27 connecting an enlarged section 28, provided with a flange 29 which may be riveted over the edge of hole 19 in inner plate 16 to attach the receptacle securely to the plate. On one side of shoulder 27, enlarged section 28 provides a space 56 for reception of a portion of the stud-attaching means, which includes grommet 17, and on the opposite side thereof shoulder 27 forms a seat 57 for a spring assembly A.

The spring assembly A includes one or more coils 30 surrounding body portion 26 and resting against or seating on shoulder 27, and a cross member, such as a pin 31, which extends through a pair of longitudinally extending, opposed slots 32 in the body of the receptacle. The ends of pin 31 may be cut away as at 33 to limit lateral movement of the pin, the ends of the pin resting against the bottom coil of the spring assembly. Slots 32 guide the pin 31 and prevent turning movement thereof. It will be understood, however, that the spring assembly coils may be made unitary with the cross member.

In assembling the receptacle, the coil of the spring assembly A may be first pressed over the tubular body portion 26, and the coil compressed while pin 31 is being inserted through slots 32 and placed in position so that when the spring is released the pin will be thrust outwardly against the material at the ends 58 of slots 32, which provide means for restraining outward movement of the cross member and spring assembly. It will be understood that other equivalent means for restraining outward movement of the spring assembly may be utilized.

In operation, the bayonet slot 21 in the stud is inserted over pin 20 in the outer plate 15, if not already in position; and the stud turned until the end 59 of the bayonet slot engages the cross member or pin 31 of the spring assembly of the receptacle. When the stud is further turned, the cross member or pin 31 of the spring assembly will be drawn inwardly towards the plates 15 and 16, and the coils of the spring assembly will be compressed. When the head end of the stud slot 21 reaches pin 20, of course, the stud can no longer be rotated in that direction, but the spring coils will by this time be compressed to hold the plates tightly together.

To lock the device in closed position, a shoulder 36 is provided substantially midway of the bayonet slot in the stud, so that the cross member of the spring assembly or pin 31 will slip into the recess provided by the shoulder and thereby prevent the stud from rotating back to an unlocking position, until sufficient torque is exerted by a suitable instrument inserted in the slot 22. Thus, when pin 31 seats in shoulder 36, the fastening device will be locked effectively in closed position, and vibration or the like will not cause the same to open, since pin 31 is prevented from rotating by guide slots 32 and the receptacle R is securely attached to inner plate 16.

To compensate for the inclination or slope of the bayonet slot in the stud, the pins 20 and 31 may be staggered with respect to each other. An advantage of guiding pin 20 lies in the fact that the stud is always in position to engage pin 31 of the receptacle within a few degrees of rotation, and no searching for the pin is necessary.

In the second embodiment of the invention, as illustrated in Figs. 5 to 8, inclusive, the elements of the fastening device are substantially identical with those of the embodiment illustrated in Figs. 1 to 4, inclusive, except that the bayonet slot 21 in stud S is provided with a locking shoulder 35 for pin 20, which prevents the stud from rotating backwardly, once the closed position is reached. Since pin 20 is attached to plate 15 through grommet 17, the stud and receptacle will be securely locked against relative rotation.

As a variation of the two embodiments just described, the stud may be provided with locking shoulders for both pin 20 and the cross member or pin 31. Thus, as in Fig. 12, stud S″ may be provided with a bayonet slot 21′ having a locking shoulder 35' for pin 20 and a locking shoulder 36' for pin 31, it being understood that stud S'' may be utilized in lieu of stud S in the constructions previously described. This will result in a double locking of the stud, and is advantageous if severe and prolonged vibration effects are to be encountered. Normally, of course, a locking shoulder for either pin is sufficient, or a locking shoulder for only the cross member or pin 31 in case the guiding pin 20 is to be omitted, as in the embodiment illustrated in Figs. 9 to 11, inclusive.

Figure 10:
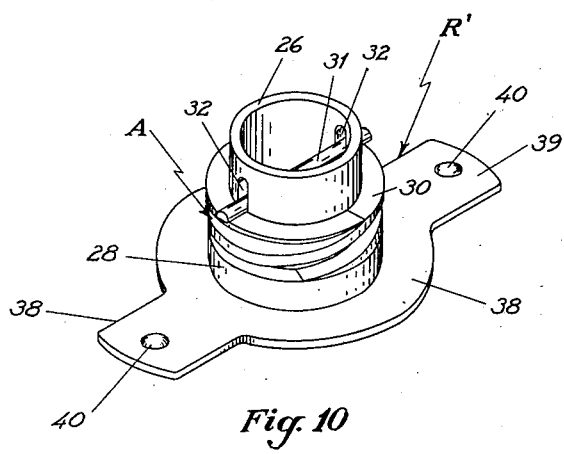
Fig. 10 is an isometric drawing of the receptacle of the fastening device of Fig. 9.
Figure 11:
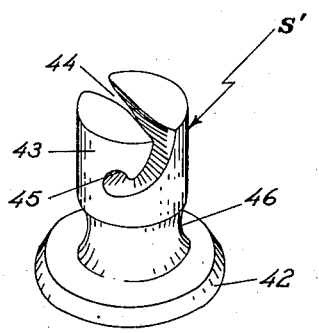
Fig. 11 is an isometric drawing of the stud of the fastening device of Fig. 9.
Figure 12:
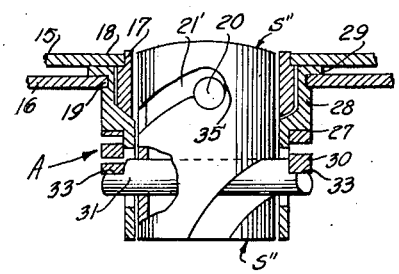
Fig. 12 is a sectional view of a stud which is a variation of the studs of Figs. 1 to 8, inclusive.

The device of Figs. 9 to 11, inclusive, is interchangeable with, or may be installed in place of the previous type of fastener, in which the special wire having a spring coil at either end is attached to the support or inner plate by a pair of rivets spaced on either side of the hole through which the stud extends to engage the wire. To provide such interchangeability, it is necessary only to provide a receptacle R' having a base 38 provided with outwardly extending tabs 39. Rivet holes 40 in the tabs permit attachment to the inner plate by rivets 41 in the same holes provided for the previous type of fastener. The receptacle R' is otherwise similar to receptacle R, including an extending tubular body portion 26' having a shoulder 27' upon which spring assembly A' rests, and connecting a section 28' of greater diameter. As before, the spring assembly includes a cross member, such as pin 31', extending through slots 32' which guide the cross member and prevent rotation thereof.

At the same time, the stud may be made more nearly like the type of stud utilized in the previous fastener, such as stud S' of Fig. 11, which includes a button head 42 provided with a slot 22' for rotating the stud, as in Fig. 9. The stud is also provided with a tubular shank 43 having a bayonet slot 44 at the inner end of which is a locking shoulder 45 adapted to function in the same manner as shoulder 36 of stud S to lock the cross member or pin 31' of the spring assembly A'.

The stud S' may be mounted for relatively free rotation with respect to the outer plate, as in the previous type of fastener. Thus, stud S' may be provided with a concave or hourglass section 46 between the head and the shank of the stud, so that the stud may be maintained for rotation and limited longitudinal movement in a grommet 47. Grommet 47 may be provided with an exterior groove 48 into which beveled edge 49 of a hole 50 in outer plate 15 is swedged or otherwise forced, to secure the grommet and stud to the outer plate. It will be understood, of course, that any other suitable type of grommet, or manner of attaching the grommet and/or stud to the outer plate, may be utilized. As before, section 28' of the receptacle provides therewithin space for reception of at least a portion of the stud-attaching means, in this instance grommet 47.

From the foregoing, it will be apparent that a device constructed in accordance with this invention is quickly and easily operated, is locked securely in closed position, is compact, and may be made interchangeable with the previous type of cowling fastener in widespread use. Since the body of the receptacle of each embodiment of this invention may be readily stamped from sheet metal, and the pins, spring coils and grommets are relatively easily made, the manufacture of a fastening device constructed in accordance with this invention is relatively simple and low in cost. Also, the stud may be made by either machining or forging operations, and is no more expensive than the studs previously in use.

It will be understood that numerous changes may be made in the construction and arrangement of the parts, including the making of certain parts as unitary assemblies and the use of a wing head on the stud, and that parts may be added or omitted without impairing the function or operability of the device. It will further be understood that other changes may be made without departing from the spirit and scope of this invention.

What is claimed is:

1. A device for fastening two parts together, comprising a receptacle adapted to be attached to one of said parts and having an extending body portion provided with a shoulder spaced from said part; a spring assembly adapted to rest on said shoulder; and a stud adapted to be turnably mounted on the other of said parts, said stud and spring assembly being provided with interengaging elements adapted to fasten said stud to said spring assembly and thereby fasten said parts together.

2. A fastening device as defined in claim 1, in which said spring assembly includes a cross member and the body portion of said receptacle is provided with opposed slots for guiding said cross member.

3. A device for fastening two parts together, comprising a receptacle adapted to be attached to one of said parts and having an outwardly extending body portion, said body portion being provided with at least one longitudinal slot; a spring assembly having coils surrounding said body portion and provided with a cross member extending through and guided by said slot; means at the outer ends of said slots for restricting outward movement of said cross member and spring assembly and a stud having a slot adapted to engage said cross member for fastening said parts together, said stud being adapted to be attached to the other of said parts.

4. In a device for attaching a pair of plates together, including a stud and means extending inwardly from one of said plates for securing said stud to said plate the improvement which comprises a receptacle adapted to be attached to the other plate and having an extending body portion provided with an enlarged section adjacent said plates adapted to form a space for reception of at least a portion of said stud-securing means; and a spring assembly having at least one coil surrounding said receptacle, said stud and spring assembly being provided with cooperating means for fastening said stud and spring assembly together and thereby fastening said plates together.

5. In a device for fastening a pair of plates together, the improvement as defined in claim 4, in which the body portion of said receptacle is provided with opposed slots, and said cooperating means includes a member extending through said slots and adapted to be engaged by a bayonet slot in said stud.

6. In a device for fastening a cowling or the like to its support, including a stud provided with a bayonet slot and means for attaching said stud to said cowling and extending inwardly from said cowling to permit the head of said stud to be substantially flush with the outer surface of said cowling, the improvement which comprises a receptacle attached to said support and having an outwardly extending tubular portion provided with longitudinal slots and a shoulder connecting an enlarged section adjacent said support to provide a space for said stud attaching means; a spring assembly having at least one coil surrounding said tubular portion and resting on said shoulder, and including a cross member extending through said slots and adapted to be engaged by the slot in said stud; and means at the outer ends of said longitudinal slots for restricting movement of said cross member longitudinally of said tubular portion, the slots in said tubular portion being adapted to guide said cross member and said stud-attaching means extending into the space within said shoulder when said cowling is fastened to said support.

7. A device for fastening a pair of plates together, comprising a stud having an inclined slot therein; means for attaching said stud to the first of said plates, said plates having openings through which said stud is insertable, said means including a pin attached to the first plate across the opening and adapted to be engaged by the slot in said stud; and means attached to the second plate and provided with a cross member engageable by the slot in said stud.

8. A device for fastening a pair of plates together as defined in claim 7, in which the slot in said stud is provided with a shoulder for locking said stud on at least one of said pin and said cross member.

9. A device for fastening a pair of plates together as defined in claim 7, in which the slot in said stud is provided with a shoulder for locking said stud to said cross member.

10. A device for fastening a pair of plates together as defined in claim 7, in which the slot in said stud is provided with a shoulder for locking said stud to said pin.

11. A device for fastening a pair of plates together as defined in claim 7, in which the slot in said stud is provided with shoulders for simultaneously locking said stud to said pin and said cross member.

12. A device for fastening two parts together, comprising a receptacle adapted to be attached to one of said parts and having an extending body portion provided with a shoulder spaced from said part; a spring assembly adapted to rest on said shoulder and provided with a cross member; a stud extending through an aperture in the second part and provided with an inclined slot adapted to engage said cross member; and a pin extending across said aperture for engagement with said slot.

13. A fastening device as defined in claim 12, in which the body portion of said receptacle is provided with opposed slots for guiding said cross member and said spring assembly comprises a spring coil and a pin having cut-away ends adapted to rest on said spring coil.

14. A device for fastening a pair of plates together, comprising a stud having an inclined slot; grommet means by which said stud may be attached to one plate, said grommet means extending inwardly toward the second plate and including a pin engageable with said stud slot; a receptacle adapted to be attached to said second plate and having an extending body portion provided with a shoulder connecting an enlarged section forming a space for reception of at least a portion of said grommet means; and a spring assembly bearing against said shoulder opposite said grommet means and including a cross member engageable with said stud slot.

15. A device for fastening a cowling or the like to a support, comprising a stud provided with a bayonet slot and adapted to extend through an aperture in said cowling; means including a pin extending across said aperture and engageable with said slot, for attaching said stud to said cowling, at least a portion of said means extending inwardly from said cowling to permit the head of said stud to be substantially flush with the outer surface of said cowling; a receptacle attached to said support and having an extending tubular portion provided with longitudinal slots and a shoulder adjacent said support; a spring assembly having at least one coil surrounding said tubular portion and resting on said shoulder, and including a pin member extending through said slots and adapted to be engaged by the slot in said stud; and means at the ends of said longitudinal slots for restricting movement of said pin member longitudinally of said tubular portion, the slots in said tubular portion being adapted to guide said pin member and said stud-attaching means extending into the space within said shoulder when said cowling is fastened to said support.

16. In a fastening device which includes a stud adapted to be attached to one of a pair of plates and a receptacle adapted to be attached to the other of said plates, said stud having an inclined slot therein, the improvement which comprises a receptacle having a tubular body portion provided with longitudinal slots; a coil spring surrounding said body portion and a cross member extending through said slots and engageable by said stud slot, said cross member being constructed and arranged to compress said coil spring when moved toward said plates by said stud; and means at the outer end of said body portion for restraining outward movement of said cross member and coil spring.

17. In a fastening device, the improvement as defined in claim 16, said stud being attached to one said plate by a grommet which extends through a hole in the plate to which said receptacle is attached, the further improvement wherein said body portion of said receptacle includes a shoulder against which said coil spring rests, said shoulder joining a portion of greater diameter forming a space to accommodate said grommet and a portion of lesser diameter surrounded by said coil spring.

18. In a device for fastening a pair of plates together, including a stud having an inclined slot and grommet means by which said stud may be attached to the first plate, said grommet means extending inwardly toward the second plate when said plates are in assembled position, the improvement which comprises a receptacle adapted to be attached to said second plate and having an extending body portion provided with a shoulder, spaced from said second plate when in assembled position, and connecting an enlarged section adjacent said second plate, said enlarged section forming a space for reception of at least a portion of said grommet means; and a spring assembly bearing against said shoulder opposite said grommet means and including a cross member adapted to cooperate with the slot in said stud for fastening said plates together.

19. In a device for fastening a pair of plates together, including a stud adapted to be attached to the first of said plates by a grommet and to extend through holes in said plates into cooperative engagement with a receptacle attached to the second of said plates, the improvement which comprises a receptacle having an extending body portion provided with a shoulder spaced from said second plate and connected to an enlarged section adjacent said second plate adapted to provide a space for at least a portion of said grommet; and a spring assembly adapted to rest against said shoulder and having means cooperating with said stud, to fasten said plates together.

RICHARD M. STORER.

REFERENCES CITED

The following references are of record in the file of this patent:

UNITED STATES PATENTS

| Number | Name | Date |
|---|---|---|
| 2,295,488 | Mack | Sept. 18, 1942 |

FOREIGN PATENTS

| Number | Country | Date |
|---|---|---|
| 816,501 | France | May 3, 1937 |

Disclaimer 2,503,305.—*Richard M. Storer*, Denver, Colo. FASTENING DEVICE. Patent dated Apr. 11, 1950. Disclaimer filed Oct. 8, 1951, by the inventor.

Hereby enters this disclaimer to claims 3 and 16 of said patent: Any interpretation of claims 3 and 16 that would include an arrangement in which the spring and cross member are not separable and distinct members.

[*Official Gazette November 20, 1951.*]